United States Patent
Krause

(10) Patent No.: US 12,361,198 B2
(45) Date of Patent: Jul. 15, 2025

(54) PRINTED CIRCUIT BOARD AND METHOD FOR DESIGNING THE SAME

(71) Applicant: 3M INNOVATIVE PROPERTIES COMPANY, St. Paul, MN (US)

(72) Inventor: Adam R. Krause, Charlotte, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 287 days.

(21) Appl. No.: 18/245,980

(22) PCT Filed: Sep. 27, 2021

(86) PCT No.: PCT/IB2021/058803
§ 371 (c)(1),
(2) Date: Mar. 20, 2023

(87) PCT Pub. No.: WO2022/074504
PCT Pub. Date: Apr. 14, 2022

(65) Prior Publication Data
US 2023/0385517 A1    Nov. 30, 2023

Related U.S. Application Data
(60) Provisional application No. 63/089,572, filed on Oct. 9, 2020.

(51) Int. Cl.
*G06F 30/30*   (2020.01)
*G06F 30/398*  (2020.01)
(Continued)

(52) U.S. Cl.
CPC ......... *G06F 30/398* (2020.01); *H05K 1/0209* (2013.01); *H05K 3/0005* (2013.01); *G06F 2115/12* (2020.01); *G06F 2119/08* (2020.01)

(58) Field of Classification Search
None
See application file for complete search history.

(56) References Cited

U.S. PATENT DOCUMENTS
11,763,062 B2 *  9/2023  Rittman ................ G06F 30/398
                                                           716/51
2008/0086709 A1  4/2008  Rittman

FOREIGN PATENT DOCUMENTS
JP   H11-025141 A   1/1999
JP   2003216680 A   7/2003
(Continued)

OTHER PUBLICATIONS
International Search Report for PCT International Application No. PCT/IB2021/058803, mailed on Dec. 30, 2021, 3 pages.
(Continued)

*Primary Examiner* — Leigh M Garbowski
(74) *Attorney, Agent, or Firm* — Johannes P. M. Kusters

(57) ABSTRACT

A computer-implemented method for designing a printed circuit board including one or more conductive layers is disclosed. The method includes determining one or more conductive elements of each conductive layer, and determining a plurality of thermal zones. Each conductive element is included in a corresponding thermal zone. The method further includes retrieving a clearance ruleset including minimum clearances for the plurality of conductive elements; selecting one conductive element and one other conductive element; determining a distance between the one conductive element and the one other conductive element in three-dimensional space; and recording a spacing violation if the distance between the one conductive element and the one other conductive element is less than the minimum clearance for the one conductive element and the one other conductive element. The method further includes
(Continued)

performing thermal analysis of electronic components of each thermal zone and recording a thermal violation based on the thermal analysis.

17 Claims, 9 Drawing Sheets

(51) Int. Cl.
 *H05K 1/02* (2006.01)
 *H05K 3/00* (2006.01)
 *G06F 115/12* (2020.01)
 *G06F 119/08* (2020.01)

(56) References Cited

FOREIGN PATENT DOCUMENTS

| | | | |
|---|---|---|---|
| JP | 2005260019 | A | 9/2005 |
| JP | 2008217227 | A | 9/2008 |

OTHER PUBLICATIONS

Ansys How To: ANSYS Siwave: Electrothermal Analyses of a PCB—Part I, May 9, 2016 (May 9, 2016), XP093209824, Retrieved from the Internet: URL:hhttps://www.youtube.com/watch?v=0-7uRu uFwiY.

Ansys How To: ANSYS Siwave: Electrothermal Analyses of a PCB—Part II, May 9, 2016 (May 9, 2016), XP093209825, Retrieved from the Internet: URL:hhttps://www.youtube.com/watch?v=0-7uRu uFwiY.

Ansys How To: ANSYS Siwave: Electrothermal Analyses of a PCB—Part III, May 9, 2016 (May 9, 2016), XP093209826, Retrieved from the Internet: URL:https://www.youtube.com/watch?v= pWObbH mDDvs.

Siemens Electronic Systems Design & Manufacturing: "Complementing Simulation with Electrical Rule Checking", XP093209332, Dec. 7, 2015 (Dec. 7, 2015), XP093209332, Retrieved from the Internet: URL:https://www.youtube.com/watch?v=Xi0MSY Rjb48.

\* cited by examiner

| Component Name | Type | Minimum Resistance (Ohm) | Thermal Resistance (K/W) | Component Surface Area (mm²) |
|---|---|---|---|---|
| R1 | Resistor | 4.7k | - | 2.4 |
| R2 | Resistor | 15k | - | 6.3 |
| IC1 | IC | - | 20 | 29.1 |
| IC2 | IC | - | 33 | 73.7 |
| R3 | Resistor | 4.7 | - | 2.4 |
| R4 | Resistor | 10k | - | 15.5 |
| IC3 | IC | - | 25 | 15.6 |

FIG. 4A

| | Thermal Zones | Type | Maximum Input Current (Ampere) | Maximum Voltage (Volt) |
|---|---|---|---|---|
| 1 | First Thermal Zone | | 2 | 10 |
| 1.1 | R1 | Resistor | | |
| 1.2 | IC1 | IC | | |
| 2 | Second Thermal Zone | | 1 | 5 |
| 2.1 | R2 | Resistor | | |
| 2.2 | IC2 | IC | | |
| 3 | Third Thermal Zone | | 1.5 | 20 |
| 3.1 | R3 | Resistor | | |
| 3.2 | R4 | Resistor | | |
| 3.2 | IC3 | IC | | |

FIG. 4B

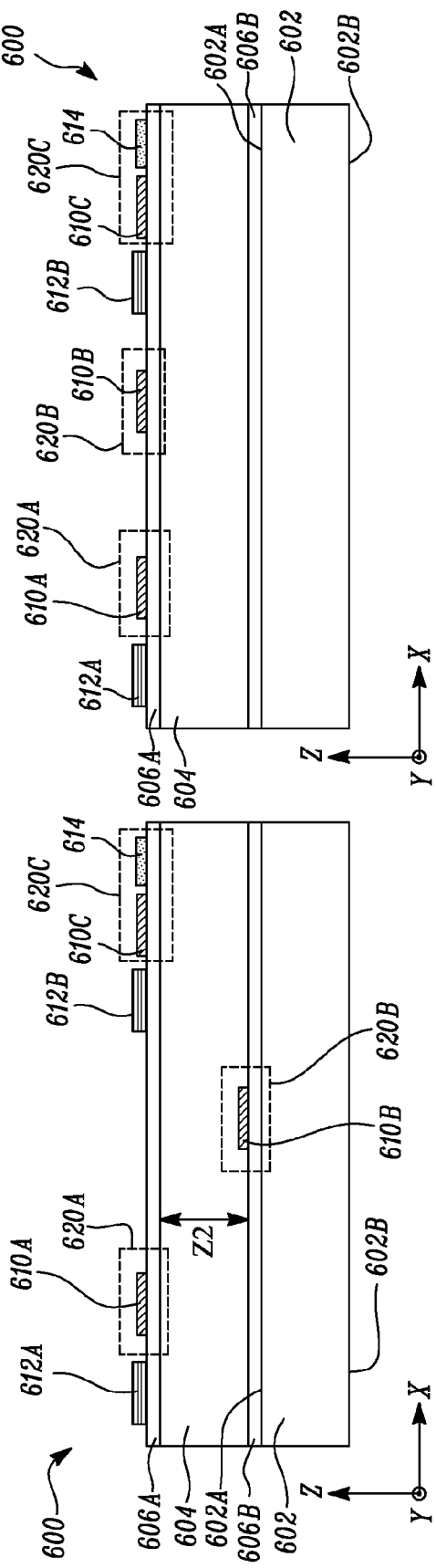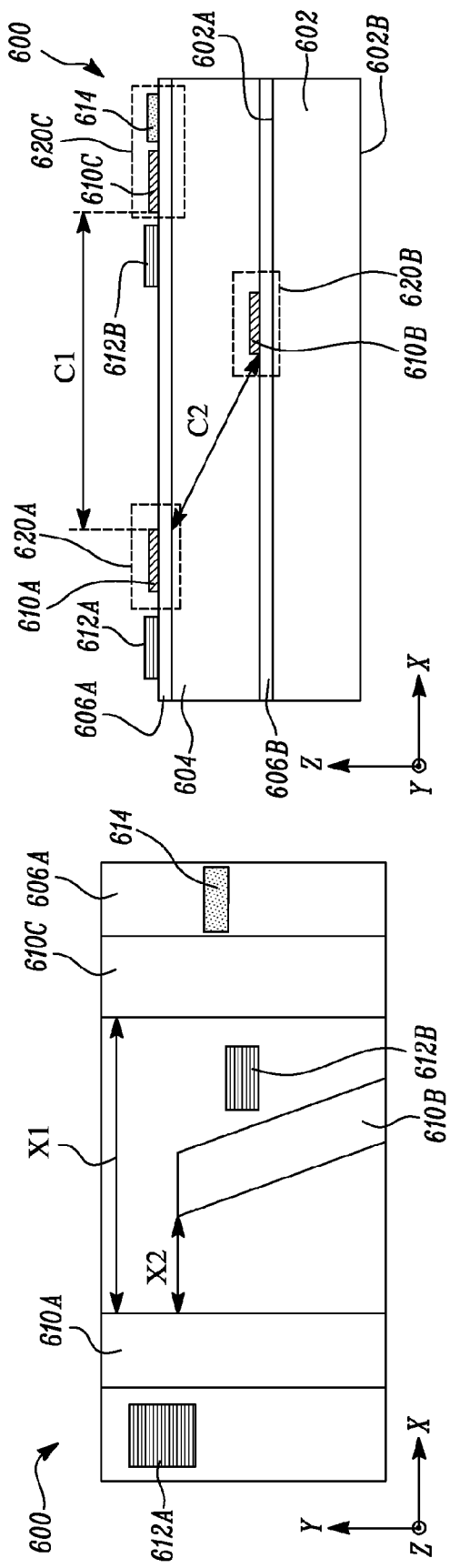

| Type | Resistor |
|---|---|
| Maximum input current receivable by thermal zone | Imax |
| Maximum voltage receivable by thermal zone | Vmax |
| Minimum resistance | Rmin |
| Maximum power dissipation | PRmax = Vmax²/Rmin |
| Maximum allowable power dissipation | PRalw |

FIG. 9A

| Type | IC |
|---|---|
| Maximum input current receivable by thermal zone | Imax |
| Maximum voltage receivable by thermal zone | Vmax |
| Total available power | Pavl |
| Minimum thermal resistance | RTmin |
| Ambient temperature | Tamb |
| Maximum surface temperature | TCSmax = [RTmin*Pavl] + Tamb |
| Maximum allowable surface temperature | TCSalw |

FIG. 9B

PRINTED CIRCUIT BOARD AND METHOD FOR DESIGNING THE SAME

TECHNICAL FIELD

The present disclosure relates generally to printed circuit boards, and in particular, to a printed circuit board compliant with intrinsic safety standards and a method for designing the printed circuit board.

BACKGROUND

Many modern safety devices include various electronic components mounted on and electrically connected by a printed circuit board (PCB). The safety devices may be operated by safety personnel in hazardous environments (e.g., explosive atmosphere). The safety devices operating in the hazardous environments may be required to be designed in such a manner that they operate safely even under certain fault conditions. To operate safely in the hazardous environments, the PCB of the safety devices may be designed in compliance with intrinsic safety (IS) standards, such as IEC 60079. The safety devices including the PCB designed in compliance with the IS standards may be referred to as "intrinsically safe".

In order for the safety devices to be intrinsically safe, a design of the PCB may have to meet certain predefined design criteria defined by the IS standards. Specifically, a minimum clearance between certain conductive elements of the PCB may be required for isolation purposes. Furthermore, a highest temperature of each component of the PCB must remain below a predefined temperature defined by the IS standards, even under worst-case fault conditions to ensure that the safety devices are safe to operate in the hazardous environments.

Existing PCB design software may be used to determine minimum clearances between conductive elements of a PCB in a single conductive layer. However, the existing PCB design software cannot determine minimum clearances between conductive elements disposed in different conductive layers of the PCB (in case of a multi-layer PCB). Moreover, the existing PCB design software cannot determine the highest temperature of each component of the PCB under the worst-case fault conditions.

Therefore, designing a PCB for intrinsically safe devices may include multiple iterations of calculations, which may be time consuming. Furthermore, designing the PCB for the intrinsically safe devices may be prone to calculation errors and thereby may fail under worst-case fault conditions.

SUMMARY

In one aspect, a computer-implemented method for designing a printed circuit board (PCB) is provided. The PCB includes one or more conductive layers, a plurality of conductive elements, and one or more barrier components. Each conductive layer includes one or more conductive elements. The one or more conductive layers include one or more outer conductive layers. The method is executed by one or more processors of one or more computing devices. The method includes determining a plurality of thermal zones. Each barrier component from the one or more barrier components transfers power to at least one corresponding thermal zone from the plurality of thermal zones. Further, each conductive element is included in a corresponding thermal zone from the plurality of thermal zones. The method further includes determining the one or more conductive elements of each conductive layer. The method further includes retrieving a clearance ruleset including minimum clearances for the plurality of conductive elements. The method further includes selecting one conductive element from the plurality of conductive elements. The method further includes selecting one other conductive element from the plurality of conductive elements, such that the one conductive element and the one other conductive element are disposed in different thermal zones and the one other conductive element is not electrically shielded from the one conductive element. The method further includes determining a distance between the one conductive element and the one other conductive element in three dimensional space. The method further includes recording a spacing violation if the distance between the one conductive element and the one other conductive element is less than the minimum clearance for the one conductive element and the one other conductive element.

In some embodiments, the method further includes determining the one or more barrier components in the one or more outer conductive layers of the PCB. The method further includes retrieving a maximum allowable surface temperature and a maximum allowable power dissipation for each thermal zone. The method further includes retrieving a library including thermal data about each electronic component of the PCB. Each thermal zone includes one or more electronic components. The method further includes retrieving a schematic including data about each electronic component disposed in each thermal zone. The schematic further includes data about a maximum input current and a maximum voltage that is receivable by each thermal zone. The method further includes determining each barrier component that transfers power into one thermal zone. The method further includes determining a maximum voltage and a maximum current available in the one thermal zone based on the schematic. The method further includes determining a total available power corresponding to the one thermal zone based on an available power from each barrier component. For one electronic component in the one thermal zone, the method further includes determining a type of the one electronic component using the library and a maximum power dissipation or a maximum surface temperature corresponding to the type of the one electronic component. The method further includes recording a thermal violation if the maximum power dissipation or the maximum surface temperature exceeds the maximum allowable power dissipation or the maximum allowable surface temperature, respectively, of the one thermal zone.

In another aspect, a computer-implemented method for designing a PCB is provided. The PCB includes a plurality of conductive layers, a plurality of conductive elements, and one or more barrier components. Each conductive layer includes one or more conductive elements. The plurality of conductive layers includes at least two outer conductive layers. The method is executed by one or more processors of one or more computing devices. The method includes determining a plurality of thermal zones. Each barrier component from the one or more barrier components transfers power to at least one corresponding thermal zone from the plurality of thermal zones. Further, each conductive element is included in a corresponding thermal zone from the plurality of thermal zones. The method further includes determining the one or more conductive elements of each conductive layer. The method further includes retrieving a clearance ruleset including minimum clearances for the plurality of conductive elements. The method further includes selecting one conductive element from the plurality of conductive elements. The one conductive element is disposed in one conductive layer. The method further includes selecting one other conductive element from the plurality of conductive elements, such that the one conductive element and the one other conductive element are disposed in different thermal zones and the one other conductive element is not electrically shielded from the one conductive element. The one other conductive element is disposed in one other conductive layer different from the one conductive layer corresponding to the one conductive element. The method further includes moving the one other conductive element to the one conductive layer corresponding to the one conductive element. The method further includes determining an in-plane distance between the one conductive element and the one other conductive element along a plane of the one conductive layer. The method further includes moving the one other conductive element back to the one other conductive layer. The method further includes determining an interlayer distance between the one conductive element and the one other conductive element along a normal to the plane of the one conductive layer. The method further includes determining a distance between the one conductive element and the one other conductive element as a square root of a sum of squares of the in-plane distance and the interlayer distance. The method further includes recording a spacing violation if the distance between the one conductive element and the one other conductive element is less than the minimum clearance for the one conductive element and the one other conductive element.

In some embodiments, the method further includes determining the one or more barrier components in the at least two outer conductive layers of the PCB. The method further includes retrieving a maximum allowable surface temperature and a maximum allowable power dissipation for each thermal zone. The method further includes retrieving a library including thermal data about each electronic component of the PCB. Each thermal zone includes one or more electronic components. The method further includes retrieving a schematic including data about each electronic component disposed in each thermal zone. The schematic further includes data about a maximum input current and a maximum voltage that is receivable by each thermal zone. The method further includes determining each barrier component that transfers power into one thermal zone. The method further includes determining a maximum voltage and a maximum current available in the one thermal zone based on the schematic. The method further includes determining a total available power corresponding to the one thermal zone based on an available power from each barrier component. For one electronic component in the one thermal zone, the method further includes determining a type of the one electronic component using the library and a maximum power dissipation or a maximum surface temperature corresponding to the type of the one electronic component. The method further includes recording a thermal violation if the maximum power dissipation or the maximum surface temperature exceeds the maximum allowable power dissipation or the maximum allowable surface temperature, respectively, of the one thermal zone.

In yet another aspect, a PCB is provided. The PCB includes one or more conductive layers. The one or more conductive layers include one or more outer conductive layers. The PCB further includes a plurality of conductive elements, such that one or more conductive elements are disposed in each conductive layer. The PCB further includes one or more barrier components, such that the one or more barrier components are disposed in at least one of the one or more outer conductive layers. The PCB further includes a plurality of thermal zones. Each thermal zone receives power from at least one barrier component from the one or more barrier components. Each thermal zone includes one or more conductive elements from the plurality of conductive elements. Further, each conductive element is included in a corresponding thermal zone from the plurality of thermal zones. One conductive element from the plurality of conductive elements is disposed in one conductive layer and one other conductive element from the plurality of conductive elements is disposed in one other conductive layer different from the one conductive layer corresponding to the one conductive element. The one conductive element and the one other conductive element are disposed in different thermal zones. The one conductive element is not electrically shielded from the one other conductive element. A distance between the one conductive element and the one other conductive element in three dimensional space is greater than or equal to a minimum clearance that satisfies the standards defined in IEC60079.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 4A is a table illustrating a library including thermal data about electronic components of the PCB according to one embodiment of the present disclosure;

FIG. 4B is a table illustrating a schematic including data about each electronic component disposed in each thermal zone of the PCB according to one embodiment of the present disclosure;

FIGS. 6A to 6D illustrate various views of a PCB according to some embodiments of the present disclosure;

FIGS. 9A and 9B are tables illustrating exemplary parameters of electronic components and thermal zones of the PCB.

DETAILED DESCRIPTION

Figure 1:
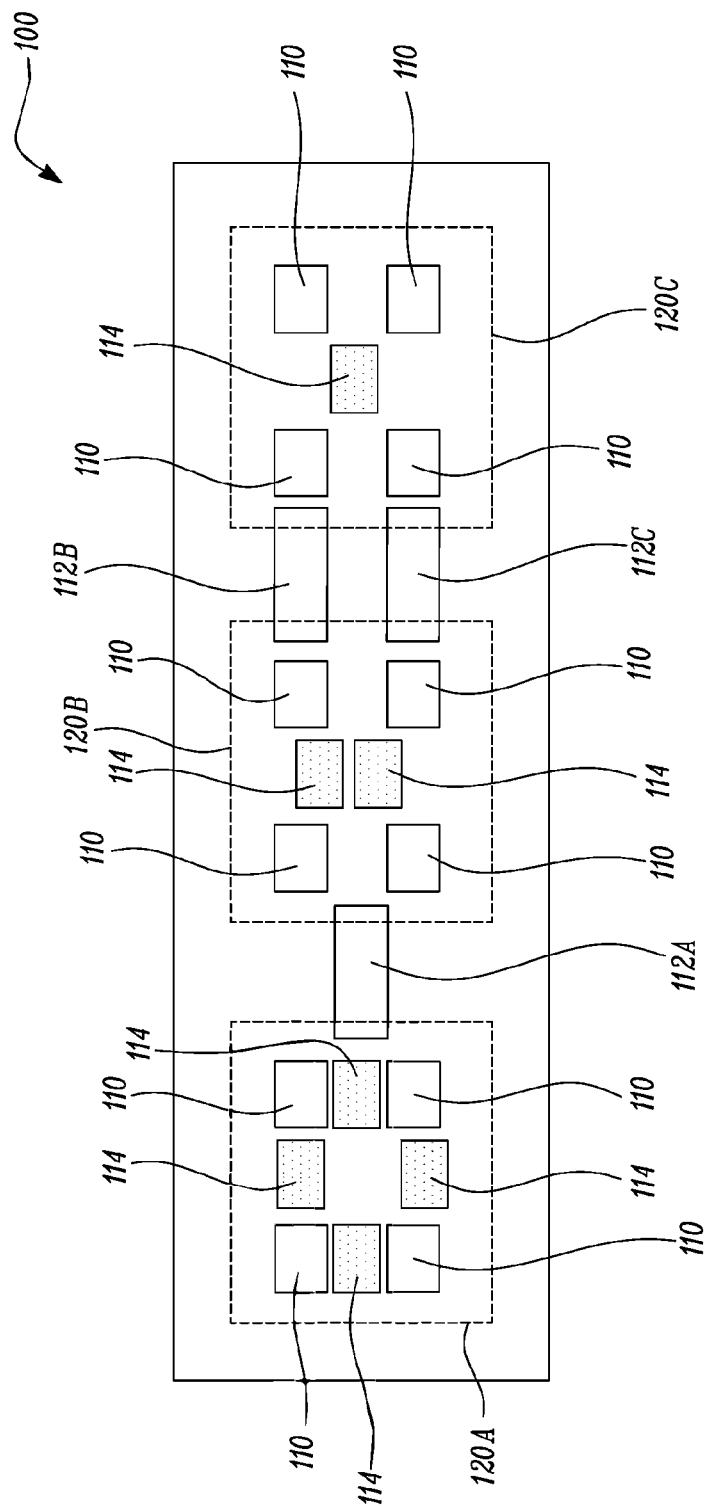
FIG. 1 is a schematic diagram of a printed circuit board (PCB) according to one embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a computer-implemented method for designing a printed circuit board (PCB). The PCB includes one or more conductive layers, a plurality of conductive elements, and one or more barrier components. Each conductive layer includes one or more conductive elements. The one or more conductive layers include one or more outer conductive layers. The computer-implemented method may be executed by one or more processors of one or more computing devices. In some embodiments, the computer-implemented method may be an automated process. In other words, the computer-implemented method may be automated by the one or more processors of the one or more computing devices. The PCB designed by the computer-implemented method may be used in safety devices used in applications, such as firefighting, mining, hazmat work, and so forth. Some examples of such safety devices include, but are not limited to, powered air-purifying respirators (PAPR), self-contained breathing apparatus (SCBA), and thermal imaging cameras (TIC).

The method includes determining a plurality of thermal zones. Each barrier component from the one or more barrier components transfers power to at least one corresponding thermal zone from the plurality of thermal zones. Further, each conductive element is included in a corresponding thermal zone from the plurality of thermal zones. The method further includes determining the one or more conductive elements of each conductive layer. The method further includes retrieving a clearance ruleset including minimum clearances for the plurality of conductive elements. The method further includes selecting one conductive element from the plurality of conductive elements. The method further includes selecting one other conductive element from the plurality of conductive elements, such that the one conductive element and the one other conductive element are disposed in different thermal zones and the one other conductive element is not electrically shielded from the one conductive element. The method further includes determining a distance between the one conductive element and the one other conductive element in three dimensional space. The method further includes recording a spacing violation if the distance between the one conductive element and the one other conductive element is less than the minimum clearance for the one conductive element and the one other conductive element.

The computer-implemented method may allow designing a PCB having a distance between the conductive elements greater than or equal to a minimum clearance that satisfies the intrinsic safety (IS) standards, such as IEC 60079. Intrinsic safety standards is a protection model employed in potentially explosive atmospheres and relies on the safety devices being designed so that it is unable to release sufficient energy by either thermal or electrical means that can cause an ignition of a flammable gas. A published discussion of this protection technique can be found at www.iec.ch. Part of (International Electrotechnical Commission) IEC 60079 specifies the construction and testing of intrinsically safe apparatus intended for use in an explosive gas atmosphere and for associated apparatus, such as the safety devices, which is to intended for connection to intrinsically safe circuits which enter such atmospheres. These are locations where ignitable concentrations of flammable gases, vapors, liquids, dust, or easily ignitable fibers are present continuously, or are present for long periods of time.

The minimum clearance between the conductive elements of the PCB may be required for isolation purposes. The computer-implemented method may further reduce a time taken to design a PCB as well as reduce errors while designing the PCB.

Therefore, the computer-implemented method may ensure that a PCB design is compliant with safety standards, such as the IS standards. In other words, a PCB designed using the computer-implemented method may be intrinsically safe and operate safely in the hazardous environments even during worst-case fault conditions.

The computer-implemented method may further aid in designing a PCB with increased packing density, thereby decreasing a size of the PCB without violating the IS standards. Decreasing the size of the PCB may further allow designing smaller safety devices, thereby improving portability of the safety devices. Therefore, the safety devices including a PCB designed by the computer-implemented method may be both safe to operate in hazardous environments, and have improved portability.

As used herein, the term "conductive" or "electrically conductive" refers to any component or material that is an electrical conductor, i.e., can conduct electrical current. For the purpose of this disclosure, an electrical conductor has a conductivity of at least $10^3$ Siemens per meter (S/m).

Referring now to the Figures, FIG. 1 illustrates a schematic diagram of an exemplary printed circuit board (PCB) 100. The PCB 100 includes one or more conductive layers. In some embodiments, the PCB 100 includes one conductive layer, i.e., the PCB 100 may be a single-layer PCB. In some other embodiments, the PCB 100 includes a plurality of conductive layers, i.e., the PCB 100 may be a multi-layer PCB. The PCB 100 further includes a plurality of conductive elements 110, one or more of barrier components 112A-112C (collectively, barrier components 112), and a plurality of electronic components 114. In the illustrated embodiment of FIG. 1, the PCB 100 includes three barrier components 112A-112C. However, in some other embodiments, the PCB 100 may include only one barrier component. For example, the PCB 100 may include any one of the barrier components 112A-112C.

The electronic components 114 may be electrically interconnected by the conductive elements 110. The electronic components 114 may include one or more of a resistor, a capacitor, a diode, an integrated circuit (IC), a battery, and the like. The conductive elements 110 may include conductive tracks, conductive pads, conductive traces, conductive fills, and the like. In some embodiments, the conductive elements 110 may be made of copper. A conductivity of the conductive elements 110 may be at least about $2 \times 10^7$ Siemens per meter (S/m). The conductive elements 110 may have any suitable shape and dimensions as per desired application attributes. In some embodiments, the conductive elements 110 may be disposed in different conductive layers. The conductive elements 110 disposed in different conductive layers may be electrically interconnected by vias. In some embodiments, one or more magnetic core structures may be provided, which in combination with the conductive elements 110 on the PCB 100, may form planar magnetic components, such as inductors and transformers.

The PCB 100 may be divided into a plurality of thermal zones 120A-120C (collectively, thermal zones 120). In the illustrated embodiment of FIG. 1, the PCB 100 includes a first thermal zone 120A, a second thermal zone 120B, and a third thermal zone 120C. Each barrier component 112A-112C from the one or more barrier components 112 transfers power to at least one corresponding thermal zone 120A-

120C from the plurality of thermal zones 120. Specifically, the barrier component 112A may transfer power to the corresponding thermal zones 120A and 120B, and the barrier components 112B, 112C may transfer power to the corresponding thermal zones 120B, 120C. Each of the barrier components 112A-112C may transfer power to one or more of the thermal zones 120A-120C.

Each conductive element 110 is included in a corresponding thermal zone 120A-120C from the plurality of thermal zones 120. Furthermore, each thermal zone 120A-120C includes one or more electronic components 114 from the plurality of electronic components 114, such that each electronic component 114 is included in the corresponding thermal zone 120A-120C. In the illustrated embodiment, each of the thermal zones 120A-120C includes multiple conductive elements 110.

Each individual thermal zone 120A-120C may be defined as a zone including a collection of the conductive elements 110 and the electronic components 114 that does not violate the IS standards when shorted together. More specifically, the collection of the conductive elements 110 and the electronic components 114 does not generate enough heat to violate the IS standards when shorted together. In certain cases, the collection of the conductive elements 110 and the electronic components 114 does not generate a spark that violates the IS standards when shorted together.

As discussed above, the barrier components 112 may transfer power to the conductive elements 110 and the electronic components 114 disposed in different thermal zones 120. As shown in FIG. 1, the barrier components 112 may straddle between two thermal zones 120. For example, the barrier component 112A straddles, and transfers power between the first thermal zone 120A and the second thermal zone 120B. Furthermore, the barrier components 112B, 112C straddle, and transfer power between the second thermal zone 120B and the third thermal zone 120C. In some embodiments, the barrier components 112 may include fuses, power transistors, resistors, and the like. In some embodiments, the barrier component 112A may include a fuse, the barrier component 112B may include a fuse, and the barrier component 112C may include a resistor.

The conductive elements 110 disposed in different thermal zones 120 may need to be electrically isolated from each other in order to comply with the IS standards. The conductive elements 110 disposed in different thermal zones 120 may be electrically isolated from each other by providing adequate distances between the conductive elements 110 disposed in different thermal zones 120. Therefore, a distance between the conductive elements 110 disposed in different thermal zones 120 that are not electrically shielded from each other must be greater than or equal to a minimum clearance defined by the IS standards, to satisfy the IS standards, such as IEC60079 and the like.

Figure 2:
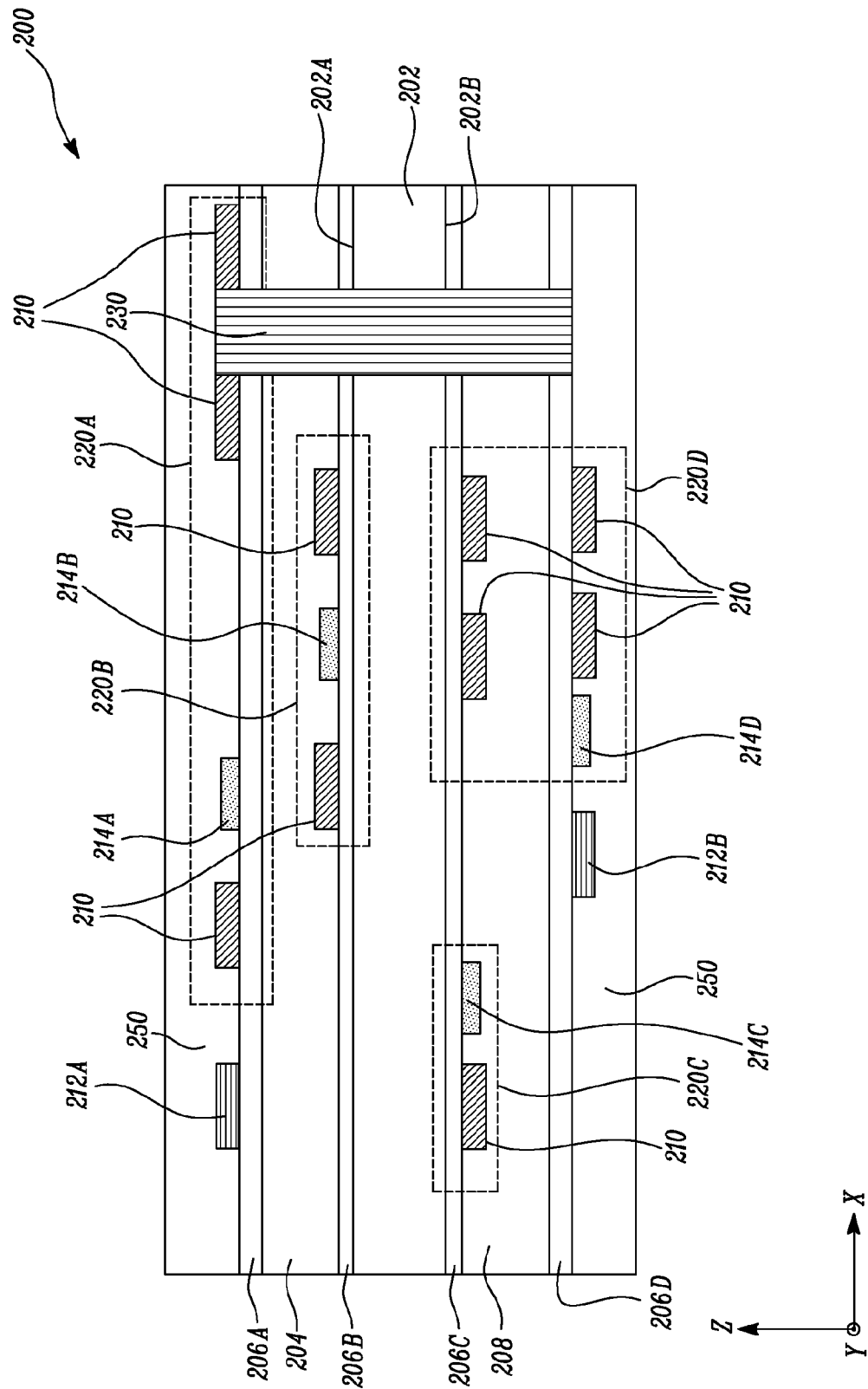
FIG. 2 is a cross-sectional view of a PCB according to one embodiment of the present disclosure.

FIG. 2 illustrates a schematic sectional view of an exemplary PCB 200. The PCB 200 of FIG. 2 is substantially similar to the PCB 100 described above with reference to FIG. 1.

Referring to FIG. 2, the PCB 200 includes a core 202. However, the PCB 200 may include multiple cores, such as two, three, four, etc., as per desired application attributes. The core 202 may include a glass-reinforced epoxy laminate material which is pressed, hardened, and cured with heat. In some embodiments, the core 202 may include Polytetrafluoroethylene (PTFE), Flame Retardant (FR)-1, FR-2, FR-3, Composite Epoxy Materials (CEM)-1, CEM-2, CEM-3, and the like. In some other embodiments, the core 202 may include FR-4. As shown in FIG. 2, the core 202 includes a first major surface 202A, and a second major surface 202B opposite to the first major surface 202A.

The PCB 200 further includes one or more conductive layers 206A-206D (collectively, conductive layers 206). In the illustrated embodiment of FIG. 2, the PCB 200 includes a plurality of conductive layers 206. However, in some other embodiments, the PCB 200 may include only one conductive layer (in case of a single-layer PCB). Specifically, the PCB 200 includes a second conductive layer 206B disposed on the first major surface 202A of the core 202, and a third conductive layer 206C disposed on the second major surface 202B of the core 202. The second conductive layer 206B and the third conductive layer 206C may be interchangeably referred to as inner conductive layers 206B, 206C.

The PCB 200 may further include a first prepreg 204 disposed on the second conductive layer 206B, and a second prepreg 208 disposed on the third conductive layer 206C. The first prepreg 204 and the second prepreg 208 may include a fiberglass fabric impregnated with a resin. The resin may be partially cured, but not hardened, while being applied on the second and third conductive layers 206B, 206C during manufacturing of the PCB 200.

As shown in FIG. 2, a first conductive layer 206A may be disposed on the first prepreg 204, and a fourth conductive layer 206D may be disposed on the second prepreg 208.

In some cases (e.g., single-layer PCB), the PCB may include only one outer conductive layer. However, in some other cases (e.g., multi-layer PCB), the PCB may include more than one outer conductive layers. As shown in FIG. 2, the one or more conductive layers 206 include one or more outer conductive layers 206A, 206D. In the illustrated embodiment of FIG. 2, the first conductive layer 206A and the fourth conductive layer 206D may be interchangeably referred to as outer conductive layers 206A, 206D. That is, in the illustrated embodiment of FIG. 2, the plurality of conductive layers 206 includes two outer conductive layers 206A, 206D.

In some embodiments, each of the conductive layers 206 may be made of an electrically conductive material, such as copper. In some other embodiments, each of the conductive layers 206 may include a dielectric material and conductive components (not shown) disposed or embedded in the dielectric material. The conductive components may include conductive traces, conductive pads, and so forth. The conductive components may electrically connect the different parts of the respective conductive layers 206. In some cases, the conductive components can be formed by etching the respective conductive layers 206.

The PCB 200 defines mutually orthogonal X, Y and Z-axes. The X and Y-axes are in-plane axes of the PCB 200, while the Z-axis is a transverse axis disposed along a thickness of the PCB 200. In other words, the X and Y-axes are disposed along a plane of the PCB 200, while the Z-axis is perpendicular to the plane of the PCB 200. The first prepreg 204, the core 202, and the second prepreg 208 of the PCB 200 may be disposed adjacent to each other along the Z-axis.

The core 202 may have a thickness ranging from about 0.5 millimeters (mm) to about 2.5 mm along the Z-axis. Furthermore, the first and second prepregs 204, 208 may have a thickness ranging from about 0.5 mm to about 2.5 mm along the Z-axis. However, the thicknesses of the core 202, the first prepreg 204, and the second prepreg 208 may vary as per desired application attributes.

The PCB 200 further includes a plurality of conductive elements 210, such that one or more conductive elements 210 are included in each conductive layer 206A-206D. In other words, the one or more conductive elements 210 are disposed in each conductive layer 206, i.e., each of the first, second, third, fourth conductive layers 206A-206D includes the one or more conductive elements 210. The PCB 200 further includes a plurality of electronic components 214A, 214B, 214C, 214D (collectively, electronic components 214). Specifically, the PCB 200 includes a first electronic component 214A, a second electronic component 214B, a third electronic component 214C, and a fourth electronic component 214D. In the illustrated embodiment of FIG. 2, each thermal zone 220A-220D includes one or more electronic components 214A-214D. As shown in FIG. 2, the first conductive layer 206A includes the first electronic component 214A, the second conductive layer 206B includes the second electronic component 214B, the third conductive layer 206C includes the third electronic component 214C, and the fourth conductive layer 206D includes the fourth electronic component 214D.

The PCB 200 may further include a via 230 to electrically interconnect the conductive elements 210 of different conductive layers 206A-206D. In the illustrated embodiment of FIG. 2, the via 230 may electrically interconnect the conductive elements 210 of the first, second, third and fourth conductive layers 206A-206D. However, the PCB 200 may include any number of vias, which may electrically interconnect any of the conductive elements 210 of the conductive layers 206 of the PCB 200.

The conductive elements 210 disposed in different thermal zones 220 and different conductive layers 206 may be electrically isolated from each other by providing electrical shielding between the conductive elements 210 disposed in the different thermal zones 220 and the different conductive layers 206. In general, electrical shielding may eliminate or minimize electromagnetic interference or coupling between two conductive parts. The electrical shielding may include ground planes. In some embodiments, the ground planes may include copper. In the illustrated embodiment of FIG. 2, the conductive elements 210 disposed in different conductive layers 206 are not electrically shielded from each other, i.e., ground planes between the conductive layers are not provided. Consequently, the PCB 200 may have to be designed such that certain safety criteria are met for the conductive elements 210 that are not electrically shielded from each other.

The PCB 200 further includes one or more barrier components 212A, 212B (collectively, barrier components 212) such that the one or more barrier components 212A, 212B are disposed in the two outer conductive layers 206A, 206D, respectively. In other words, the one or more barrier components 212A, 212B are disposed in the one or more outer conductive layers 206A, 206D of the PCB 200.

Specifically, the PCB 200 includes a first barrier component 212A and a second barrier component 212B. The one or more barrier components 212 are included in the one or more outer conductive layers 206A, 206D of the PCB 200. However, in some embodiments, the one or more barrier components 212 are disposed in at least one of the one or more outer conductive layers 206A, 206D of the PCB 200, i.e., the one or more barrier components 212 may be disposed in only one of the two outer conductive layers 206A, 206D of the PCB 200. In the illustrated embodiment of FIG. 2, the first barrier component 212A is disposed in the first conductive layer 206A, and the second barrier component 212B is disposed in the fourth conductive layer 206D.

The PCB 200 further includes a plurality of thermal zones 220A-220D (collectively, thermal zones 220). Specifically, the PCB 200 includes a first thermal zone 220A, a second thermal zone 220B, a third thermal zone 220C, and a fourth thermal zone 220D. Each thermal zone 220A-220D includes the one or more conductive elements 210 from the plurality of conductive elements 210. Further, each conductive element 210 is included in a corresponding thermal zone 220A-220D from the plurality of thermal zones 220. In the illustrated embodiment of FIG. 2, the first thermal zone 220A includes the conductive elements 210 of the first conductive layer 206A. Similarly, the second thermal zone 220B includes the conductive elements 210 of the second conductive layer 206B. Likewise, the third thermal zone 220C includes corresponding conductive elements 210 of the third conductive layer 206C, and the fourth thermal zone 220D includes corresponding conductive elements 210 of the third conductive layer 206C and the fourth conductive layer 206D.

The barrier components 212 may transfer power between the thermal zones 220. Each thermal zone 220A-220D receives power from at least one barrier component 212A, 212B from the one or more barrier components 212. For example, the first barrier component 212A may transfer power between the first and the second thermal zones 220A, 220B. In other words, the first and second thermal zones 220A, 220B may receive power from the first barrier component 212A. In another example, the second barrier component 212B may transfer power between the third and fourth thermal zones 220C, 220D. In other words, the third and fourth thermal zones 220C, 220D may receive power from the second barrier component 212B. In some embodiments, the barrier components 212 may be electrically connected to the corresponding thermal zones 220A-220D through conductive components, such as conductive traces, conductive pads, or combinations thereof. The conductive components may be disposed in the corresponding outer conductive layers 206A, 206D.

In some embodiments, the first conductive layer 206A may be coated by a solder mask 250. Similarly, the fourth conductive layer 206D may also be coated by the solder mask 250. The solder mask 250 may protect the conductive elements 210 of the first conductive layer 206A and the fourth conductive layer 206D against dust, moisture, and oxidation.

Figure 3:
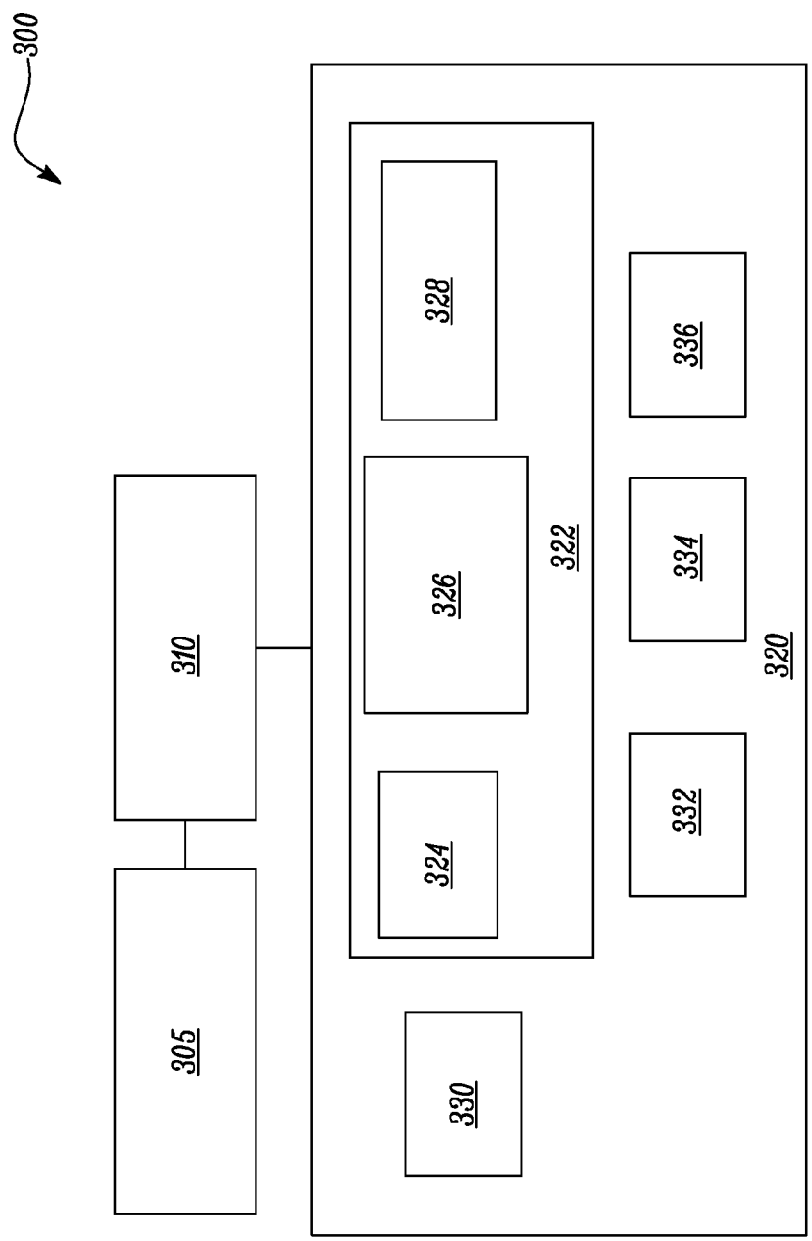
FIG. 3 is a block diagram of a computing device according to one embodiment of the present disclosure.

FIG. 3 illustrates an exemplary computing device 300. In some embodiments, the computing device 300 may be a desktop computer or a portable computer. The computing device 300 may execute and automate various methods and processes. In some embodiments, one or more of the computing devices 300 may execute a method for designing the PCB 100 (shown in FIG. 1). In some other embodiments, the one or more of the computing devices 300 may execute a method for designing the PCB 200 (shown in FIG. 2).

Referring to FIG. 3, the computing device 300 includes a processor 310. The computing device 300 further includes a memory 320 communicably coupled to the processor 310. The computing device 300 furthers include a user interface 305 communicably coupled to the processor 310. The processor 310 may include any suitable type of processing circuitry, such as one or more of a general-purpose processor (e.g., ARM-based processor), a Digital Signal Processor (DSP), a Programmable Logic Device (PLD), an Application-Specific Integrated Circuit (ASIC), a Field-Programmable Gate Array (FPGA), etc. In operation, the processor 310 may execute, for example, a control and/or communication-related operation or data processing for at least one other component of the computing device 300.

The user interface 305 may include input devices, such as a mouse and a keyboard, for receiving inputs from a user.

The user interface 305 may further include output devices, such as a monitor and speakers for providing outputs to the user. In some cases, the user interface 305 may include a touch sensitive interface.

The memory 320 may include any suitable type of volatile and/or non-volatile memory, such as Random-access Memory (RAM), Read-Only Memory (ROM), Network Accessible Storage (NAS), cloud storage, a Solid State Drive (SSD), etc. The memory 320 may store, for example, a command or data related to at least one other component of the computing device 300. In some embodiments, the memory 320 may store software and/or a program.

As shown in FIG. 3, the memory 320 may store an IS ruleset 322. The IS ruleset 322 may correspond to PCB design criteria defined by the IS standards. In some embodiments, the IS ruleset 322 includes a clearance ruleset 324, a maximum allowable surface temperature ruleset 326, and a maximum allowable power dissipation ruleset 328.

Referring to FIGS. 2 and 3, the clearance ruleset 324 may define a minimum distance between the conductive elements 210 disposed in the different thermal zones 220A-220D of the PCB 200. The minimum distance may be required for isolation purposes, i.e., electrically isolating the conductive elements 210 disposed in different thermal zones 220A-220D. For example, the minimum distance between the conductive elements 210 disposed in different thermal zones 220A-220D of the PCB 200 may range from about 0.2 mm to about 70 mm. The PCB 200 may be designed such that a distance between conductive elements 210 disposed in different thermal zones 220 is greater than the minimum distance defined by the clearance ruleset 324, such that the PCB 200 is compliant with the IS standards.

The maximum allowable surface temperature ruleset 326 may define a maximum allowable temperature of a surface of each of the electronic components 214 the PCB 200. The maximum allowable surface temperature may be defined by the IS standards such that a maximum surface temperature of the electronic components 214 of the PCB 200 does not cause an explosion in the hazardous environments, for example, an explosive atmosphere. The PCB 200 may be designed such that the maximum surface temperature of the electronic components 214 of the PCB 200 does not exceed the maximum allowable surface temperature as defined by the maximum allowable surface temperature ruleset 326.

The maximum allowable power dissipation ruleset 328 may define a maximum allowable power dissipation for each thermal zone 220A-220D. The PCB 200 may be designed such that a maximum power dissipation by each of the electronic components 214 of each thermal zone 220A-220D of the PCB 200 does not exceed the maximum allowable power dissipation as defined by the maximum allowable power dissipation ruleset 328.

The memory 320 may further store an application programming interface (API) (not shown). The memory 320 may further store an electronic design automation (EDA) software 330. The EDA software 330 may be used to design the PCB 200. Examples of EDA software include, but are not limited to, Altium, Eagle, Cadence, OrCAD, etc. The EDA software 330 may import the API from the memory 320. The EDA software 330 may be used to generate a circuit design of the PCB 200, and further generate a PCB layout 332 of the PCB 200. The EDA software 330 may further generate a "GERBER" file or the like, that may be fed into a PCB fabrication machine to fabricate the PCB 200. The memory 320 may further store the PCB layout 332. The PCB layout 332 includes geometric data of each conductive layer 206A-206D of the PCB 200. In some embodiments, the geometric data may include relative geometric positions of the conductive layers 206, the conductive elements 210, the barrier components 212, and the electronic components 214 of the PCB 200.

The memory 320 may further store a library 334 and a schematic 336. The library 334 and the schematic 336 will be further explained in detail with reference to FIGS. 4A and 4B.

FIG. 4A illustrates an example of the library 334. As shown in FIG. 4A, the library 334 may include the thermal data of the plurality of electronic components 214, such as resistors, ICs, etc. For example, the library 334 may include thermal data about each electronic component 214A, 214B, 214C, 214D of the PCB 200 (shown in FIG. 2). In some embodiments, the library 334 may include corresponding minimum resistances of resistors of the PCB 200, and thermal resistances of ICs of the PCB 200. The library 334 may further include information about a type (i.e., resistor, IC, etc.) of the electronic components 214 of the PCB 200. In some embodiments, the library 334 may further include information about a component surface area of the electronic components 214. The component surface area may determine how much power a respective electronic component 214 may dissipate. In some embodiments, the component surface area may determine how high a temperature of a surface of respective electronic component 214 of the PCB 200 may reach during power dissipation. The library 334 may be based on the PCB layout 332 (shown in FIG. 3). The library 334 may be retrieved by any component of the computing device 300. In some embodiments, the library 334 may be retrieved by the EDA software 330.

FIG. 4B illustrates an example of the schematic 336. The schematic 336 includes data about each electronic component 214 disposed in the corresponding thermal zone 220A-220D. For example, the schematic 336 may include data about each thermal zone 220A-220D of the PCB 200 (shown in FIG. 2). The schematic 336 may further include information about a maximum current and a maximum voltage that is receivable by each thermal zone 220A-220D. In some embodiments, the schematic 336 may be based on the PCB layout 332 (shown in FIG. 3). The schematic 336 may be retrieved by any component of the computing device 300. In some embodiments, the schematic 336 may be retrieved by the EDA software 330.

Figure 5B:
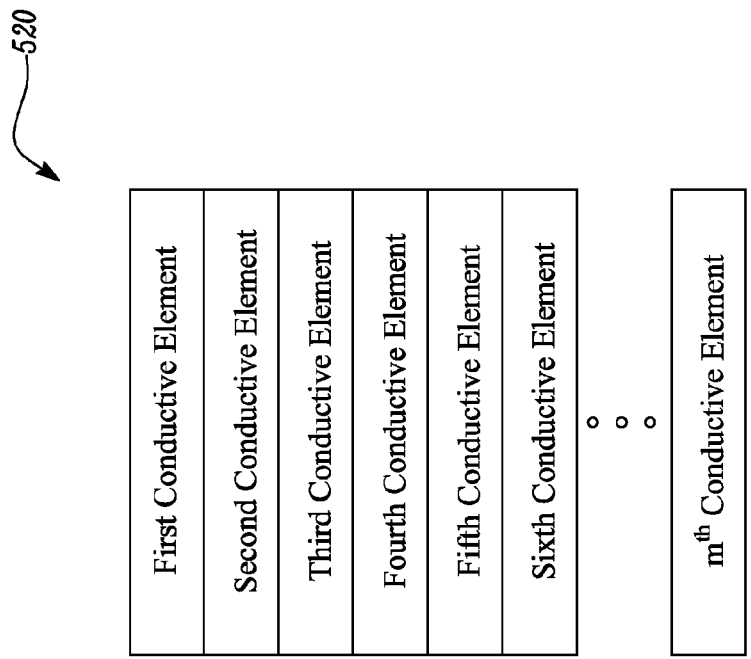
FIGS. 5A and 5B are lists of conductive layers and conductive elements, respectively, according to one embodiment of the present disclosure.
Figure 5A:
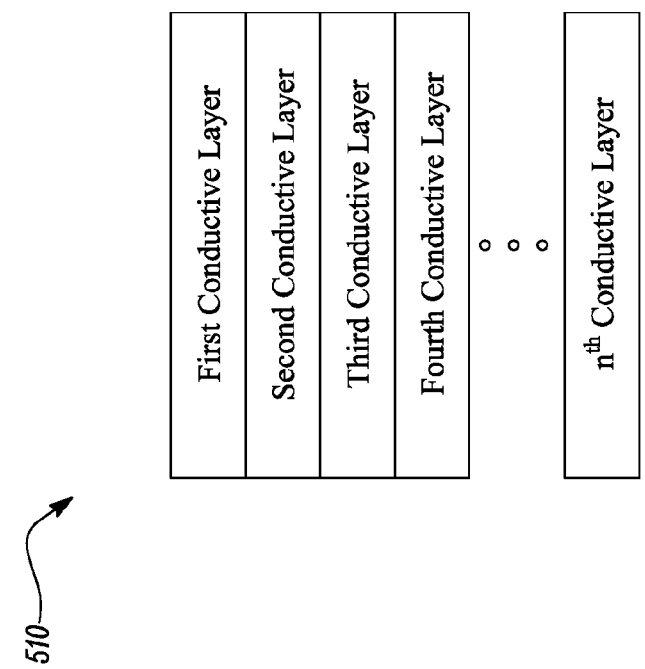

FIGS. 5A and 5B illustrate exemplary lists 510, 520, respectively. Referring to FIGS. 5A and 5B, the list 510 may include information regarding the conductive layers 206 (shown in FIG. 2). The list 520 may include information regarding the conductive elements 210 (shown in FIG. 2). In some embodiments, the lists 510, 520 may be generated by the EDA software 330 and stored in the memory 320 (shown in FIG. 3). In some embodiments, the lists 510, 520 may be based on the PCB layout 332 (shown in FIG. 3).

FIGS. 6A-6D illustrate various views of a portion of an exemplary PCB 600. The PCB 600 of FIGS. 6A-6D is substantially similar to the PCB 200 described above with reference to FIG. 2, with equivalent numbers used to represent like elements. Some elements of the PCB 200 of FIG. 2 are not shown in the PCB 600 of FIG. 6 for the purpose of clarity.

The PCB 600 includes a core 602. The core 602 includes a first major surface 602A and a second major surface 602B opposite to the first major surface 602A. The PCB 600 further includes one or more conductive layers 606A, 606B (collectively, conductive layers 606). In the illustrated embodiment of FIGS. 6A-6D, the PCB 600 includes a plurality of conductive layers 606. However, in some other embodiments, the PCB 600 may include only one conductive layer (in case of a single-layer PCB). Specifically, the PCB 600 includes a first conductive layer 606A, and a second conductive layer 606B. The second conductive layer 606B may be disposed on the first major surface 602A of the core 602. The PCB 600 furthers include a first prepreg 604 disposed on the second conductive layer 606B. The first conductive layer 606A may be disposed on the first prepreg 604. In the illustrated portion of the PCB 600 in FIGS. 6A-6D, the first conductive layer 606A is an outer conductive layer. In other words, the PCB 600 includes at least one outer conductive layer 606A. However, it may be noted that the PCB 600 includes at least two outer conductive layers (one outer conductive layer not shown for clarity purposes).

The PCB 600 defines mutually orthogonal X, Y and Z-axes. The X and Y-axes are in-plane axes of the PCB 600, while the Z-axis is a transverse axis disposed along a thickness of the PCB 600. In other words, the X and Y-axes are disposed along a plane of the PCB 600, while the Z-axis is perpendicular to the plane of the PCB 600. The first prepreg 604 and the core 602 may be disposed adjacent to each other along the Z-axis.

The PCB 600 further includes a plurality of conductive elements 610. In the illustrated portion of the PCB 600, the PCB 600 includes a first conductive element 610A, a second conductive element 610B, and a third conductive element 610C. Specifically, the first conductive layer 606A of the PCB 600 includes the first conductive element 610A and the third conductive element 610C. Furthermore, the second conductive layer 606B of the PCB 600 includes the second conductive element 610B. Each conductive layer 606 includes one or more conductive elements 610.

The PCB 600 further includes a plurality of thermal zones 620. Specifically, the PCB 600 includes a first thermal zone 620A, a second thermal zone 620B, and a third thermal zone 620C. In the illustrated embodiment of FIG. 6, the first, second and third conductive elements 610A, 610B, 610C are included in the respective first, second and third thermal zones 620A, 620B, 620C. Specifically, the first thermal zone 620A includes the first conductive element 610A. Furthermore, the second thermal zone 620B includes the second conductive element 610B, and the third thermal zone 620C includes the third conductive element 610C.

The PCB 600 further includes one or more barrier components 612. As shown in FIG. 6A, the PCB 600 includes the barrier components 612A, 612B in the outer conductive layer 606A of the PCB 600. Specifically, the PCB 600 may include a first barrier component 612A and a second barrier component 612B. Each barrier component 612A, 612B transfers power to at least one corresponding thermal zone 620A-620C from the plurality of thermal zones 620. For example, the first barrier component 612A may transfer power between the first and second thermal zones 620A, 620B. Furthermore, the second barrier component 612B may transfer power between the second and third thermal zones 620B, 620C. In some embodiments, the second barrier component 612B may transfer power to the third thermal zone 620C.

The PCB 600 may further include a plurality of electronic components 614. However, in the illustrated portion of the PCB 600, only one electronic component 614 is shown for clarity purposes. It may be noted that the PCB 600 may include more than one electronic component 614. As shown in FIGS. 6A-6D, the electronic component 614 may be included in the third thermal zone 620C.

In the illustrated embodiment of FIGS. 6A-6D, the first, second and third conductive elements 610A, 610B, 610C are not electrically shielded from each other. Therefore, in order to comply with the IS standards, there may be a requirement of maintaining a clearance between the first, second and third conductive elements 610A, 610B, 610C. There may also be a requirement of maintaining a maximum temperature of a surface of the electronic component 614 of the PCB 600 during certain fault conditions.

Referring to FIG. 6A, the first, second and third conductive elements 610A, 610B, 610C have corresponding interlayer and in-plane distances between them. The third conductive element 610C has an interlayer distance Z1 (not shown in FIG. 6A, since Z1 is substantially equal to zero) from the first conductive element 610A. The interlayer distance Z1 is substantially zero along the Z-axis, since the first conductive element 610A and the third conductive element 610C are on the same conductive layer, i.e., the first conductive layer 606A. Furthermore, the second conductive element 610B may be at an interlayer distance Z2 from the first conductive element 610A along the Z-axis. The interlayer distance Z2 is the distance between the first conductive layer 606A and the second conductive layer 606B. Therefore, the interlayer distance Z2 may be a minimum distance between the first and second conductive elements 610A, 610B along the Z-axis, i.e., normal to the plane of the first conductive layer 606A.

Referring to FIG. 6B, the second conductive element 610B may be moved to the first conductive layer 606A from the second conductive layer 606B. In some embodiments, the second conductive element 610B may be moved to the first conductive layer 606A by the EDA software 330 (shown in FIG. 3), in order to determine an in-plane distance between the first and second conductive elements 610A, 610B.

FIG. 6C illustrates a top view of the portion of the PCB 600 after the second conductive element 610B is moved to the first conductive layer 606A by the EDA software 330 (shown in FIG. 3). Referring to FIG. 6C, the third conductive element 610C may be at an in-plane distance X1 from the first conductive element 610A along a plane of the first conductive layer 606A. Specifically, the in-plane distance X1 may be a minimum distance between the first and third conductive elements 610A, 610C along the X-Y plane. In other words, the in-plane distance X1 may be a minimum in-plane distance between the first and third conductive elements 610A, 610C along the plane of the first conductive layer 606A. Furthermore, the second conductive element 610B may be at an in-plane distance X2 from the first conductive element 610A. The in-plane distance X2 may be a minimum distance between the first and second conductive elements 610A, 610B along the X-Y plane. In other words, the in-plane distance X2 may be a minimum in-plane distance between the first and second conductive elements 610A, 610B along the X-Y plane. After determining the in-plane distance X2, the second conductive element 610B may be moved back to the second conductive layer 606B.

Referring to FIG. 6D, the second conductive element 610B is moved back to the second conductive layer 606B from the first conductive layer 606A by the EDA software 330 (shown in FIG. 3). The third conductive element 610C may be at a distance C1 from the first conductive element 610A in three dimensional space. The distance C1 may be a minimum distance between the first and third conductive elements 610A, 610C in three dimensional space. The distance C1 may be determined by the equation: $C1=\sqrt{X1^2+Z1^2}$.

However, since Z1=0 (both the first conductive element 610A and the third conductive element 610C are disposed in the same conductive layer, i.e., the first conductive layer 606A), C1=X1.

Moreover, the second conductive element 610B may be at a distance C2 from the first conductive element 610A in three-dimensional space. The distance C2 may be a minimum distance between the first and second conductive elements 610A, 610B in three dimensional space. The distance C2 may be determined by the equation: $C2=\sqrt{X2^2+Z2^2}$.

In some embodiments, the distance C1 between the first conductive element 610A and the third conductive element 610C in three dimensional space is greater than or equal to the minimum clearance that satisfies the standards defined in IEC60079. In some embodiments, the distance C2 between the first conductive element 610A and the second conductive element 610B in three dimensional space is greater than or equal to the minimum clearance that satisfies the standards defined in IEC60079.

The conductive elements, the barrier components, and the electronic components, as shown in FIGS. 1, 2, 6A-6D, are exemplary in nature, and may have any shape or configuration as per desired application attributes. Further, the PCBs 100, 200, 600 are illustrated as substantially having a rectangular cross-section. However, the PCBs 100, 200, 600 may have any suitable shape as per desired application attributes.

Figure 7:
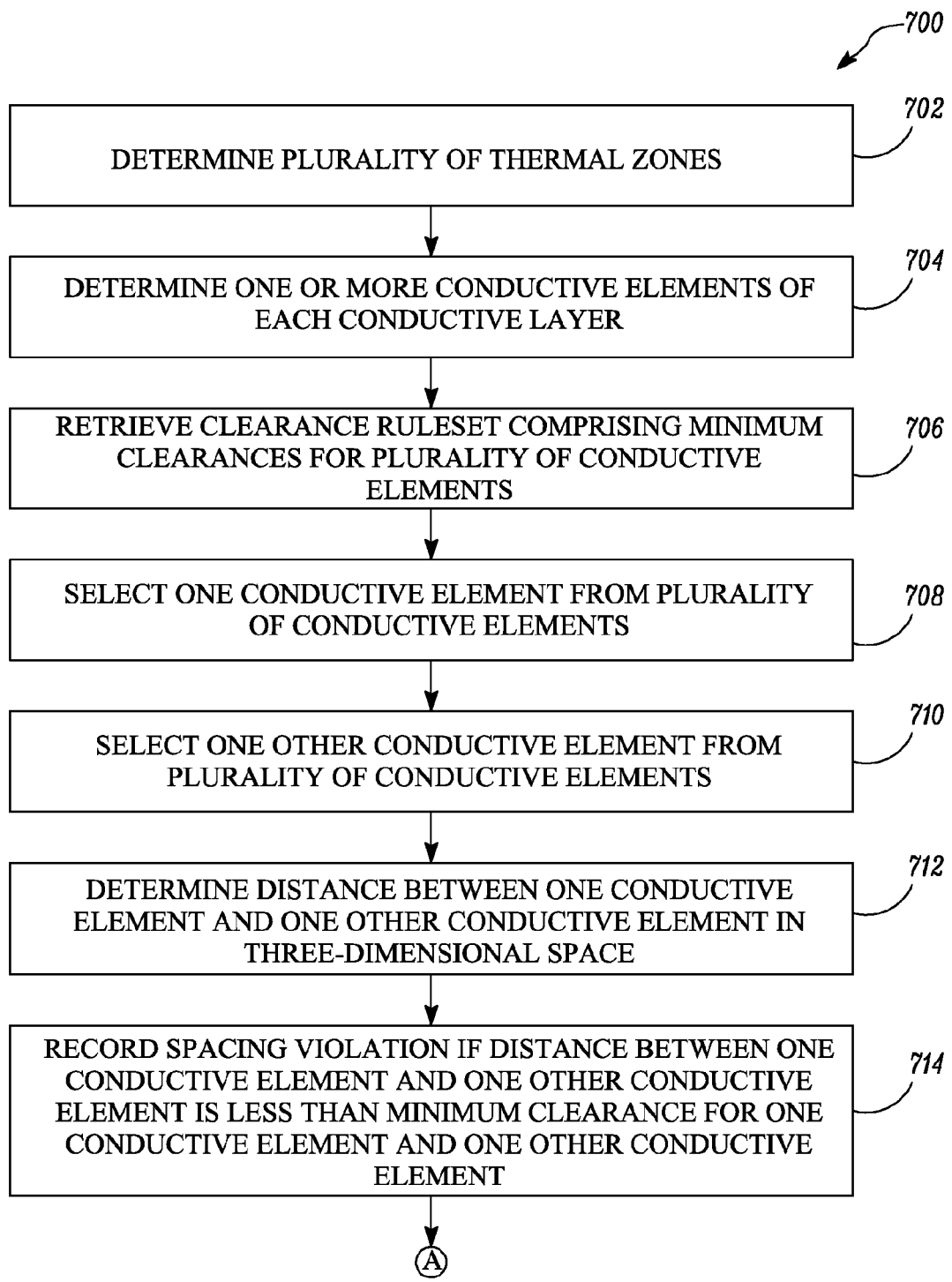
FIG. 7 is a flowchart illustrating a method for designing a PCB according to one embodiment of the present disclosure.

FIG. 7 illustrates a computer-implemented method 700 (hereinafter, referred to as "the method 700") for designing the PCB 100 (shown in FIG. 1). In some embodiments, the method 700 may be used for designing the PCB 200 (shown in FIG. 2). In some other embodiments, the method 700 may be used for designing the PCB 600 (shown in FIGS. 6A-6D) The method 700 may be automated by the computing device 300 (shown in FIG. 3). In some embodiments, the method 700 may be included in the API stored in the memory 320 (shown in FIG. 3). That is, the computing device 300 may import the API including the method 700 into the EDA software 330 from the memory 320. In some embodiments, the method 700 is executed by one or more processors 310 of the one or more computing devices 300. The method 700 will be explained with reference to FIGS. 3, 4A, 4B, 5A, 5B, and 6A-6D.

As discussed above, the PCB 600 includes the one or more conductive layers 606, the plurality of conductive elements 610, the one or more barrier components 612, and the plurality of electronic components 614. The method 700 includes the following steps:

At step 702, the method 700 includes determining the plurality of thermal zones 620. In some embodiments, the plurality of conductive elements 610 are disposed in different thermal zones 620A-620C. For example, the first conductive element 610A is disposed in the first thermal zone 620A, the second conductive element 610B is disposed in the second thermal zone 620B, and the third conductive element 610C is disposed in the third thermal zone 620C. Each barrier component 612A, 612B from the one or more barrier components 612 transfers power to the at least one corresponding thermal zone 620A-620C from the plurality of thermal zones 620. Further, each conductive element 610A-610C is included in a corresponding thermal zone 620A-620C from the plurality of thermal zones 620.

At step 704, the method 700 further includes determining the one or more conductive elements 610A-610C of each conductive layer 606A, 606B. In some embodiments, determining the one or more conductive elements 610A-610C in each conductive layer 606A, 606B further includes retrieving the PCB layout 332 including the geometric data of each conductive layer 606A, 606B. In some embodiments, the method 700 further includes generating the list 510 of the one or more conductive layers 606A, 606B based on the PCB layout 332. In some embodiments, the method 700 further includes generating the list 510 of the plurality of conductive layers 606A, 606B based on the PCB layout 332.

The method 700 further includes generating the list 520 of the plurality of conductive elements 610 based on the PCB layout 332. Therefore, the one or more conductive elements 610A-610C of each conductive layer 606A, 606B are determined based on the list 510 of the one or more conductive layers 606 and the list 520 of the plurality of conductive elements 610. In some embodiments, the generated lists 510, 520 may be stored in the memory 320 of the computing device 300.

At step 706, the method 700 further includes retrieving the clearance ruleset 324 including the minimum clearances for the plurality of conductive elements 610. As discussed above, the clearance ruleset 324 may correspond to the IS standards. The clearance ruleset 324 may be included in the IS ruleset 322.

At step 708, the method 700 further includes selecting one conductive element from the plurality of conductive elements 610. The one conductive element may be any one of the plurality of conductive elements 610.

At step 710, the method 700 further includes selecting one other conductive element from the plurality of conductive elements 610, such that the one conductive element and the one other conductive element are disposed in different thermal zones 620 and the one other conductive element is not electrically shielded from the one conductive element.

Any one of the first, second, and third conductive elements 610A, 610B, 610C may be the one conductive element, and any one of the first, second, and third conductive elements 610A, 610B, 610C except the one conductive element may be the one other conductive element. For example, when the first conductive element 610A is the one conductive element, any one of the second and third conductive elements 610B, 610C may be the one other conductive element.

For explanatory purposes, in this embodiment, the method 700 selects the first conductive element 610A as the one conductive element.

In some examples, the method 700 may select the second conductive element 610B as the one other conductive element. In some other examples, the method may select the third conductive element 610C as the one other conductive element.

In some embodiments, the method 700 further includes determining the thermal zones of the one conductive element and the one other conductive element. For example, the method 700 determines the first thermal zone 620A as the thermal zone of the first conductive element 610A. In case, the one other conductive element is the second conductive element 610B, the method 700 determines the second thermal zone 620B as the thermal zone of the second conductive element 610B In case, the one other conductive element is the third conductive element 610C, the method 700 determines the third thermal zone 620C as the thermal zone of the third conductive element 610C.

In some embodiments, the one conductive element is disposed in one conductive layer and the one other conductive element is disposed in one other conductive layer different from the one conductive layer corresponding to the one conductive element.

Any one of the first and second conductive layers 606A, 606B may be one conductive layer, and any one of the first and second conductive layers 606A, 606B, except the one conductive layer may be one other conductive layer. For example, when the first conductive layer 606A is the one conductive layer, the second conductive layer 606B is the one other conductive layer.

In the illustrated example, the first conductive element 610A is disposed in the first conductive layer 606A and the second conductive element 610B is disposed in the second conductive layer 606B, which is different from the first conductive layer 606A corresponding to the first conductive element 610A.

In some embodiments, the one conductive element and the one other conductive element are disposed in the same conductive layer, i.e., any one of the first conductive layer 606A or the second conductive layer 606B. For example, the first conductive element 610A and the third conductive element 610C are both disposed in the first conductive layer 606A.

At step 712, the method 700 further includes determining a distance between the one conductive element and the one other conductive element in three dimensional space. For example, the distance C1 between the first conductive element 610A and the third conductive element 610C, and/or the distance C2 between the first conductive element 610A and the second conductive element 610B are determined.

In some embodiments, determining the distance between the one conductive element and the one other conductive element further includes moving the one other conductive element to the one conductive layer corresponding to the one conductive element. For example, the second conductive element 610B is moved to the first conductive layer 606A corresponding to the first conductive element 610A.

Determining the distance between the one conductive element and the one other conductive element further includes determining an in-plane distance between the one conductive element and the one other conductive element along a plane of the one conductive layer. For example, the in-plane distance X2 between the first conductive element 610A and the second conductive element 610B along X-Y plane of the first conductive layer 606A is determined.

Determining the distance between the one conductive element and the one other conductive element further includes moving the one other conductive element back to the one other conductive layer. For example, the second conductive element 610B is moved back to the second conductive layer 606B.

Determining the distance between the one conductive element and the one other conductive element further includes determining an interlayer distance between the one conductive element and the one other conductive element along a normal to the plane of the one conductive layer. For example, the interlayer distance Z2 between the first conductive element 610A and the second conductive element 610B along the normal (Z-axis) to the plane (X-Y plane) of the first conductive layer 606A is determined.

The distance between the one conductive element and the one other conductive element is determined as a square root of a sum of squares of the in-plane distance and the interlayer distance. For example, the distance C2 between the first conductive element 610A and the second conductive element 610B is determined as the square root of the sum of squares of the in-plane distance X2 and the interlayer distance Z2.

In some other embodiments, the in-plane distance corresponds to the distance between the one conductive element and the one other conductive element. In such cases, the one conductive element and the one other conductive element are disposed in any one of the first conductive layer 606A or the second conductive layer 606B. For example, the first conductive element 610A and the third conductive element 610C are disposed in the first conductive layer 606A. Therefore, the in-plane distance X1 corresponds to the distance C1 between the first conductive element 610A and the third conductive element 610C.

At step 714, the method 700 further includes recording a spacing violation if the distance between the one conductive element and the one other conductive element is less than the minimum clearance for the one conductive element and the one other conductive element. In case, the one other conductive element is the second conductive element 610B, recording the spacing violation if the distance C2 between the first conductive element 610A and the second conductive element 610B is less than the minimum clearance defined by the clearance ruleset 324 for the first conductive element 610A and the second conductive element 610B. In case, the one other conductive element is the third conductive element 610C, recording the spacing violation if the distance C1 between the first conductive element 610A and the third conductive element 610C is less than the minimum clearance defined by the clearance ruleset 324 for the first conductive element 610A and the third conductive element 610C.

In an example, the minimum clearance for the first and third conductive elements 610A, 610C is denoted by C1min and the minimum clearance for the first and second conductive elements 610A, 610B is denoted by C2min. If C1≥C1min, and C2≥C2min, then the PCB 600 conforms to the standards defined in IEC60079. However, a spacing violation occurs if C1<C1min, and/or C2<C2min.

In some embodiments, recording the spacing violation may include generating a report including the details of the conductive elements 610 of the PCB 600 that violate the minimum clearance defined by the clearance ruleset 324. In some embodiments, recording the spacing violation may include highlighting the conductive elements 610 of the PCB 600 that violate the minimum clearance defined by the clearance ruleset 324 in the EDA software 330. In some embodiments, recording the spacing violation may further include reporting the spacing violation by a design check rule (DRC) of the EDA software 330.

Figure 8:
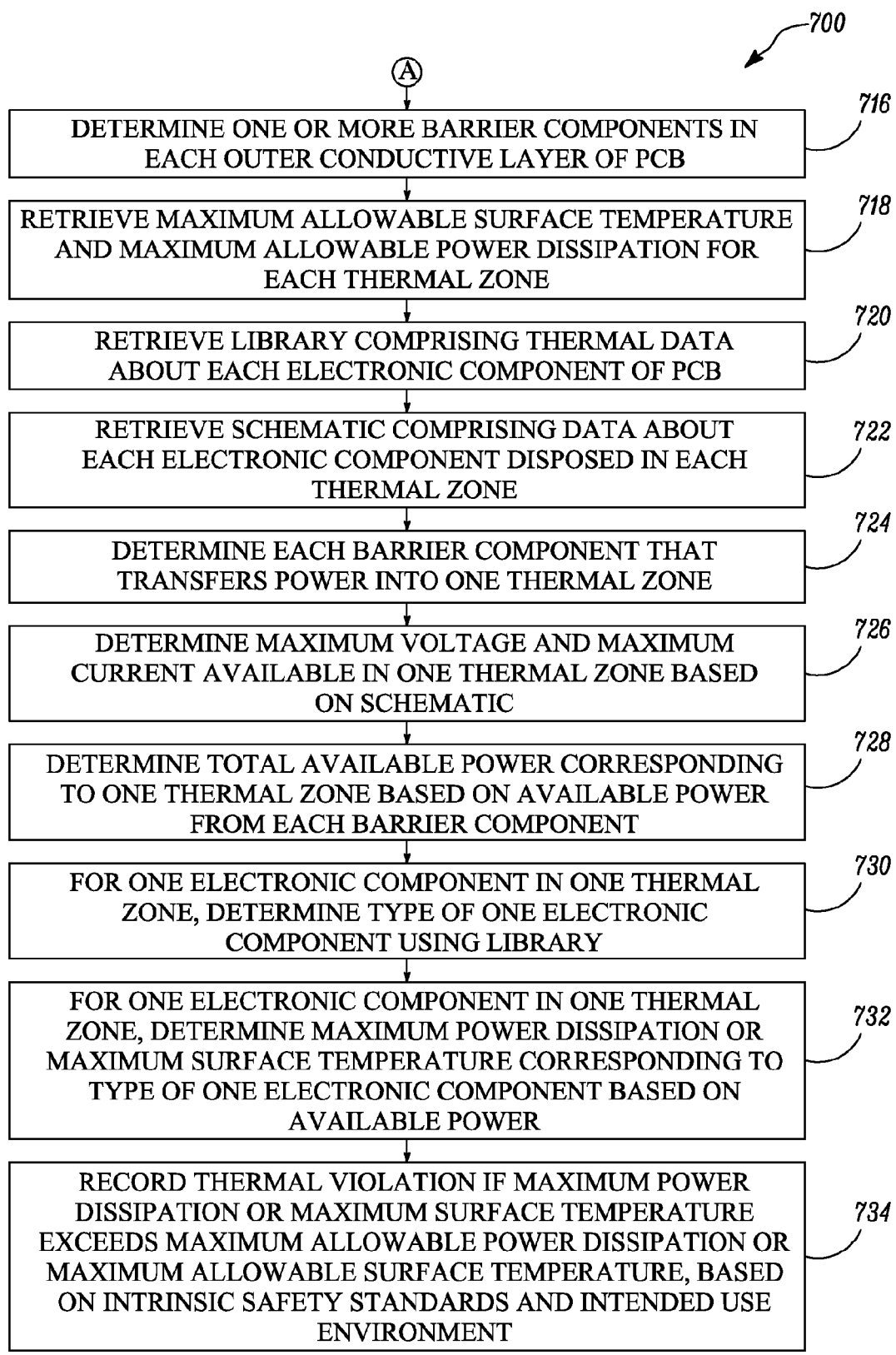
FIG. 8 is a flowchart illustrating the method for designing a PCB according to one embodiment of the present disclosure.

FIGS. 9A and 9B illustrate exemplary Tables 910, 920. Tables 910, 920 include various parameters that will be referred to while describing the method 700 (shown in FIGS. 7 and 8).

Referring to FIGS. 3, 4A, 4B, 6A-6D, 8 and 9A-9B, in some embodiments, the method 700 further includes the following steps:

At step 716, the method 700 further includes determining the one or more barrier components in the one or more outer conductive layers of the PCB. In some embodiments, the method 700 further includes determining the one or more barrier components in the at least two outer conductive layers of the PCB. For example, the barrier components 612A, 612B in the outer conductive layer 606A of the PCB 600 are determined.

At step 718, the method 700 further includes retrieving a maximum allowable surface temperature and a maximum allowable power dissipation for each thermal zone. For example, the maximum allowable surface temperature and the maximum allowable power dissipation for each thermal zone 620A-620C are retrieved.

The maximum allowable surface temperature may be retrieved from the maximum allowable surface temperature ruleset 326. The maximum allowable power dissipation may be retrieved from the maximum allowable power dissipation ruleset 328. The maximum allowable surface temperature ruleset 326 and the maximum allowable power dissipation ruleset 328 may be defined by the IS ruleset 322. As shown in Tables 910, 920, the maximum allowable surface temperature is TCSalw, and the maximum allowable power dissipation is PRalw.

At step 720, the method 700 further includes retrieving a library including thermal data about each electronic component of the PCB. For example, the library 334 including the thermal data about the electronic component 614 of the PCB 600 is retrieved. In some embodiments, each thermal zone 620A-620C includes one or more electronic components 614.

At step 722, the method 700 further includes retrieving a schematic including data about each electronic component disposed in each thermal zone. The schematic further includes data about the maximum input current and the maximum voltage that is receivable by each thermal zone.

For example, the schematic 336 including the data about the electronic component 614 disposed in the third thermal zone 620C is retrieved. The schematic 336 may further include data about the maximum input current and the maximum voltage that is receivable by the third thermal zone 620C.

At step 724, the method 700 further includes determining each barrier component that transfers power into one thermal zone. For example, the barrier component 612B is determined as the barrier component that transfers power into the third thermal zone 620C.

At step 726, the method 700 further includes determining a maximum voltage and a maximum current available in the one thermal zone based on the schematic. For example, the maximum voltage and the maximum current available in the third thermal zone 620C based on the schematic 336 are determined. As shown in Tables 910, 920, the maximum input current that is receivable by the third thermal zone 620C is Imax. Further, the maximum voltage that is receivable by the third thermal zone 620C is Vmax.

At step 728, the method 700 further includes determining a total available power corresponding to the one thermal zone based on an available power from each barrier component. For example, the total available power corresponding to the third thermal zone 620C is determined based on the available power from the barrier component 612B. As shown in Table 920, the total available power to the third thermal zone 620C is Pavl.

At step 730, the method 700 further includes, for one electronic component in the one thermal zone, determining the type of the one electronic component using the library. For example, for the electronic component 614 in the third thermal zone 620C, the type of the electronic component 614 is determined using the library 334.

At step 732, the method 700 further includes, for the one electrical component in the one thermal zone, determining a maximum power dissipation or a maximum surface temperature corresponding to the type of the one electronic component based on available power. For example, the maximum power dissipation or the maximum surface temperature corresponding to the type of the electronic component 614 in the third thermal zone 620C are determined. As shown in Tables 910, 920, the maximum power dissipation in the electronic component 614 is PRmax when the electronic component 614 is a resistor. Further, the maximum surface temperature of the electronic component 614 is TCSmax when the electronic component 614 is an IC.

In some embodiments, if the type of the one electronic component is a resistor, determining the maximum power dissipation or the maximum surface temperature further includes determining a minimum resistance of the resistor using the library. For example, if the type of the electronic component 614 is a resistor, determining the maximum power dissipation or the maximum surface temperature further includes determining a minimum resistance of the resistor using the library 334. As shown in Table 910, the minimum resistance of the electronic component 614 is Rmin when the electronic component 614 is a resistor.

Determining the maximum power dissipation or the maximum surface temperature further includes determining the maximum power dissipation in the resistor as a ratio between a square of the maximum voltage receivable by the one thermal zone and the minimum resistance of the resistor. For example, the maximum power dissipation in the resistor is determined as the ratio between the square of the maximum voltage receivable by the third thermal zone 620C and the minimum resistance of the resistor. The maximum power dissipation can be calculated by the following equation:

$$PR\max = V\max{}^2 / R\min$$

In some embodiments, determining the maximum power dissipation or the maximum surface temperature further includes determining a minimum thermal resistance of the one electronic component using the library. For example, determining the maximum power dissipation or the maximum surface temperature further includes determining the minimum thermal resistance of the electronic component 614 using the library 334. As shown in Table 920, the minimum thermal resistance of the electronic component 614 is RTmin when the electronic component 614 is an IC.

Furthermore, determining the maximum power dissipation or the maximum surface temperature further includes determining the maximum surface temperature of the one electronic component while dissipating the maximum power by a sum of a product of the minimum thermal resistance and the total available power, and an ambient temperature. For example, the maximum surface temperature of the electronic component 614 while dissipating the maximum power is determined. As shown in Table 920, the maximum surface temperature of the electronic component 614 is TCSmax, and the minimum thermal resistance is RTmin. Further, the ambient temperature is Tamb. The maximum surface temperature can be calculated by the following equation:

$$TCS\max = [RT\min * Pavl] + Tamb$$

At step 734, the method 700 further includes recording a thermal violation if the maximum power dissipation or the maximum surface temperature exceeds the maximum allowable power dissipation or the maximum allowable surface temperature, respectively, of the one thermal zone. For example, a thermal violation is recorded if the maximum power dissipation or the maximum surface temperature exceeds the maximum allowable power dissipation or the maximum allowable surface temperature, respectively, of the third thermal zone 620C.

As discussed above, the maximum power dissipation of the electronic component 614 is denoted by PRmax when the electronic component 614 is a resistor, and the maximum surface temperature of the electronic component 614 is denoted by TCSmax when the electronic component 614 is an IC. If PRalw≥PRmax, and TCSalw≥TCSmax, then the PCB 600 conforms to the standards defined in IEC60079. However, a thermal violation occurs if TCSalw<TCSmax, and/or PRalw<PRmax.

In some embodiments, the maximum power dissipation or the maximum surface temperature may be based on the IS standards and an intended use environment (i.e., the hazardous environments) of the safety equipment and devices including the PCB 600.

In some embodiments, the method 700 may further include calculating a sum of a total capacitance and inductance of the electronic components of the PCB to evaluate spark limits. For example, the sum of the total capacitance and inductance of the electronic components 114 (shown in FIG. 1) of the PCB 100 is calculated to evaluate spark limits. In some embodiments, the IS ruleset 322 may further include a maximum energy storage rule. The maximum energy storage rule may define a maximum energy storage defined by the IS ruleset 322. By limiting the sum of the total capacitance and inductance of the electronic components 114 of the PCB 100 under the maximum energy storage defined by the maximum energy storage rule, a spark may not occur during certain fault conditions of the safety devices including the PCB 100.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A computer-implemented method for designing a printed circuit board (PCB) comprising one or more conductive layers, a plurality of conductive elements and one or more barrier components, each conductive layer comprising one or more conductive elements, the one or more conductive layers comprising one or more outer conductive layers, the method executed by one or more processors of one or more computing devices, the method comprising:
   determining a plurality of thermal zones, wherein each barrier component from the one or more barrier components transfers power to at least one corresponding thermal zone from the plurality of thermal zones, and wherein each conductive element is included in a corresponding thermal zone from the plurality of thermal zones;
   determining the one or more conductive elements of each conductive layer;
   retrieving a clearance ruleset comprising minimum clearances for the plurality of conductive elements;
   selecting one conductive element from the plurality of conductive elements;
   selecting one other conductive element from the plurality of conductive elements, such that the one conductive element and the one other conductive element are disposed in different thermal zones and the one other conductive element is not electrically shielded from the one conductive element;
   determining a distance between the one conductive element and the one other conductive element in three dimensional space; and
   recording a spacing violation if the distance between the one conductive element and the one other conductive element is less than the minimum clearance for the one conductive element and the one other conductive element.

2. The computer-implemented method of claim 1, wherein the one conductive element is disposed in one conductive layer and the one other conductive element is disposed in one other conductive layer different from the one conductive layer corresponding to the one conductive element.

3. The computer-implemented method of claim 2, wherein determining the distance between the one conductive element and the one other conductive element further comprises:
   moving the one other conductive element to the one conductive layer corresponding to the one conductive element;

determining an in-plane distance between the one conductive element and the one other conductive element along a plane of the one conductive layer;

moving the one other conductive element back to the one other conductive layer; and determining an interlayer distance between the one conductive element and the one other conductive element along a normal to the plane of the one conductive layer;

wherein the distance between the one conductive element and the one other conductive element is determined as a square root of a sum of squares of the in-plane distance and the interlayer distance.

4. The computer-implemented method of claim 1, wherein the one conductive element and the one other conductive element are disposed in a conductive layer.

5. The computer-implemented method of claim 4, wherein determining the distance between the one conductive element and the one other conductive element further comprises determining an in-plane distance between the one conductive element and the one other conductive element, wherein the in-plane distance corresponds to the distance between the one conductive element and the one other conductive element.

6. The computer-implemented method of claim 1, wherein determining the one or more conductive elements in each conductive layer further comprises:

retrieving a PCB layout comprising a geometric data of each conductive layer;

generating a list of the one or more conductive layers based on the PCB layout; and generating a list of the plurality of conductive elements based on the PCB layout;

wherein the one or more conductive elements of each conductive layer are determined based on the list of the one or more conductive layers and the list of the plurality of conductive elements.

7. The computer-implemented method of claim 1 further comprising determining the thermal zones of the one conductive element and the one other conductive element.

8. The computer-implemented method of claim 1 further comprising:

determining the one or more barrier components in the one or more outer conductive layers of the PCB;

retrieving a maximum allowable surface temperature and a maximum allowable power dissipation for each thermal zone;

retrieving a library comprising thermal data about each electronic component of the PCB, each thermal zone including one or more electronic components;

retrieving a schematic comprising data about each electronic component disposed in each thermal zone, the schematic further comprising data about a maximum input current and a maximum voltage that is receivable by each thermal zone;

determining each barrier component that transfers power into one thermal zone;

determining a maximum voltage and a maximum current available in the one thermal zone based on the schematic;

determining a total available power corresponding to the one thermal zone based on an available power from each barrier component;

for one electronic component in the one thermal zone, determining:

a type of the one electronic component using the library; and a maximum power dissipation or a maximum surface temperature corresponding to the type of the one electronic component; and recording a thermal violation if the maximum power dissipation or the maximum surface temperature exceeds the maximum allowable power dissipation or the maximum allowable surface temperature, respectively, of the one thermal zone.

9. The computer-implemented method of claim 8, wherein, if the type of the one electronic component is a resistor, determining the maximum power dissipation or the maximum surface temperature further comprises:

determining a minimum resistance of the resistor using the library; and determining the maximum power dissipation in the resistor as a ratio between a square of the maximum voltage receivable by the one thermal zone and the minimum resistance of the resistor.

10. The computer-implemented method of claim 8, wherein determining the maximum power dissipation or the maximum surface temperature further comprises:

determining a minimum thermal resistance of the one electronic component using the library; and determining the maximum surface temperature of the one electronic component while dissipating the maximum power by a sum of a product of the minimum thermal resistance and the total available power and an ambient temperature.

11. A computer-implemented method for designing a printed circuit board (PCB) comprising a plurality of conductive layers, a plurality of conductive elements and one or more barrier components, each conductive layer comprising one or more conductive elements, the plurality of conductive layers comprising at least two outer conductive layers, the method executed by one or more processors of one or more computing devices, the method comprising the steps of:

determining a plurality of thermal zones, wherein each barrier component from the one or more barrier components transfers power to at least one corresponding thermal zone from the plurality of thermal zones, and wherein each conductive element is included in a corresponding thermal zone from the plurality of thermal zones;

determining the one or more conductive elements of each conductive layer;

retrieving a clearance ruleset comprising minimum clearances for the plurality of conductive elements;

selecting one conductive element from the plurality of conductive elements, wherein the one conductive element is disposed in one conductive layer;

selecting one other conductive element from the plurality of conductive elements, such that the one conductive element and the one other conductive element are disposed in different thermal zones, the one other conductive element is not electrically shielded from the one conductive element, and the one other conductive element is disposed in one other conductive layer different from the one conductive layer corresponding to the one conductive element;

moving the one other conductive element to the one conductive layer corresponding to the one conductive element;

determining an in-plane distance between the one conductive element and the one other conductive element along a plane of the one conductive layer;

moving the one other conductive element back to the one other conductive layer;

determining an interlayer distance between the one conductive element and the one other conductive element along a normal to the plane of the one conductive layer;

determining a distance between the one conductive element and the one other conductive element as a square root of a sum of squares of the in-plane distance and the interlayer distance; and recording a spacing violation if the distance between the one conductive element and the one other conductive element is less than the minimum clearance for the one conductive element and the one other conductive element.

12. The computer-implemented method of claim 11, wherein determining the one or more conductive elements in each conductive layer further comprises:

retrieving a PCB layout comprising a geometric data of each conductive layer;

generating a list of the plurality of conductive layers based on the PCB layout; and generating a list of the plurality of conductive elements based on the PCB layout;

wherein the one or more conductive elements of each conductive layer are determined based on the list of the plurality of conductive layers and the list of the plurality of conductive elements.

13. The computer-implemented method of claim 11 further comprising determining the thermal zones of the one conductive element and the one other conductive element.

14. The computer-implemented method of claim 11 further comprising:

determining the one or more barrier components in the at least two outer conductive layers of the PCB;

retrieving a maximum allowable surface temperature and a maximum allowable power dissipation for each thermal zone;

retrieving a library comprising thermal data about each electronic component of the PCB, each thermal zone including one or more electronic components;

retrieving a schematic comprising data about each electronic component disposed in each thermal zone, the schematic further comprising data about a maximum input current and a maximum voltage that is receivable by each thermal zone;

determining each barrier component that transfers power into one thermal zone;

determining a maximum voltage and a maximum current available in the one thermal zone based on the schematic;

determining a total available power corresponding to the one thermal zone based on an available power from each barrier component;

for one electronic component in the one thermal zone, determining:

a type of the one electronic component using the library; and a maximum allowable power dissipation or a maximum surface temperature corresponding to the type of the one electronic component; and recording a thermal violation if the maximum power dissipation or the maximum surface temperature exceeds the maximum allowable power dissipation or the maximum allowable surface temperature, respectively, of the one thermal zone.

15. The computer-implemented method of claim 14, wherein, if the type of the one electronic component is a resistor, determining the maximum power dissipation or the maximum surface temperature further comprises:

determining a minimum resistance of the resistor using the library; and determining the maximum power dissipation in the resistor as a ratio between a square of the maximum voltage receivable by the one thermal zone and the minimum resistance of the resistor.

16. The computer-implemented method of claim 14, wherein determining the maximum power dissipation or the maximum surface temperature further comprises:

determining a minimum thermal resistance of the one electronic component using the library; and determining the maximum surface temperature of the one electronic component while dissipating the maximum power by a sum of a product of the minimum thermal resistance and the total available power and an ambient temperature.

17. A printed circuit board (PCB) comprising:

one or more conductive layers, the one or more conductive layers comprising one or more outer conductive layers;

a plurality of conductive elements, such that one or more conductive elements are disposed in each conductive layer;

one or more barrier components, such that the one or more barrier components are disposed in at least one of the one or more outer conductive layers; and a plurality of thermal zones, wherein each thermal zone receives power from at least one barrier component from the one or more barrier components, and wherein each thermal zone comprises one or more conductive elements from the plurality of conductive elements, and wherein each conductive element is included in a corresponding thermal zone from the plurality of thermal zones;

wherein one conductive element from the plurality of conductive elements is disposed in one conductive layer and one other conductive element from the plurality of conductive elements is disposed in one other conductive layer different from the one conductive layer corresponding to the one conductive element, such that:

the one conductive element and the one other conductive element are disposed in different thermal zones;

the one conductive element is not electrically shielded from the one other conductive element; and a distance between the one conductive element and the one other conductive element in three dimensional space is greater than or equal to a minimum clearance that satisfies the standards defined in IEC60079.

* * * * *